United States Patent

Nishio et al.

[11] Patent Number: 5,995,666
[45] Date of Patent: Nov. 30, 1999

[54] STILL PICTURE TRANSMISSION SYSTEM

[75] Inventors: Toshiroh Nishio, Hirakata; Hidekazu Suzuki, Yamatokoriyama; Souichirou Katsuki, Katano; Masashi Kubota, Kobe, all of Japan

[73] Assignee: Matsushita Electric Industrial Co., Ltd., Osaka-fu, Japan

[21] Appl. No.: 08/739,757

[22] Filed: Oct. 29, 1996

[30] Foreign Application Priority Data

Nov. 1, 1995 [JP] Japan ................................. 7-284764

[51] Int. Cl.$^6$ .................................................. G06K 9/36
[52] U.S. Cl. ............................................................ 382/232
[58] Field of Search .............................. 345/146, 328; 348/6, 7, 12, 13, 143, 385, 468, 554, 563–570, 906; 369/32, 47; 386/46, 70, 106, 111, 125, 126

[56] References Cited

U.S. PATENT DOCUMENTS

| | | | |
|---|---|---|---|
| 4,685,001 | 8/1987 | Martin ..................................... | 358/342 |
| 4,845,571 | 7/1989 | Hirano et al. ............................ | 358/342 |
| 4,876,597 | 10/1989 | Roy et al. ................................ | 348/143 |
| 4,924,303 | 5/1990 | Brandon et al. . | |
| 5,027,400 | 6/1991 | Baji et al. ................................. | 380/20 |
| 5,107,343 | 4/1992 | Kawai ..................................... | 358/341 |
| 5,448,568 | 9/1995 | Delpuch et al. . | |
| 5,557,320 | 9/1996 | Krebs ...................................... | 348/12 |
| 5,585,838 | 12/1996 | Lawler et al. ............................ | 348/13 |
| 5,594,709 | 1/1997 | Nagano et al. ........................... | 369/32 |
| 5,627,657 | 5/1997 | Park ........................................ | 386/70 |
| 5,633,683 | 5/1997 | Rosengren et al. ...................... | 348/385 |
| 5,651,087 | 7/1997 | Nagano et al. ........................... | 386/51 |
| 5,687,160 | 11/1997 | Aotake et al. ....................... | 369/275.3 |
| 5,701,385 | 12/1997 | Katsuyama et al. ................... | 386/106 |
| 5,740,304 | 4/1998 | Katsuyama et al. ..................... | 386/46 |

FOREIGN PATENT DOCUMENTS

| | | |
|---|---|---|
| 0705036 | 4/1996 | European Pat. Off. . |
| 6-86222 | 3/1994 | Japan . |

OTHER PUBLICATIONS

English Langauge Abstract of Japanese Publication No. 6–86222.

Primary Examiner—Jose L. Couso
Attorney, Agent, or Firm—Greenblum & Bernstein, P.L.C.

[57] ABSTRACT

A still picture transmission system has a transmitter and a receiver. The transmitter includes a still picture generator for generating video data of a plurality of still pictures, an entry number generator for generating an entry number for each still picture, and a picture information generator for generating a picture information to each still picture. A list data is generated containing the entry numbers and corresponding picture informations. An encoder encodes the video data with the entry number inserted in a predetermined position correspondingly to each still picture. A multiplexer multiplexes and transmits the encoded video signal with the list data. The receiver separates the encoded video signal and list data. The list data is displayed. Looking at the list data, a particular entry number is selected. A still picture with the particular entry number is extracted from the encoded video signal and displayed.

12 Claims, 13 Drawing Sheets

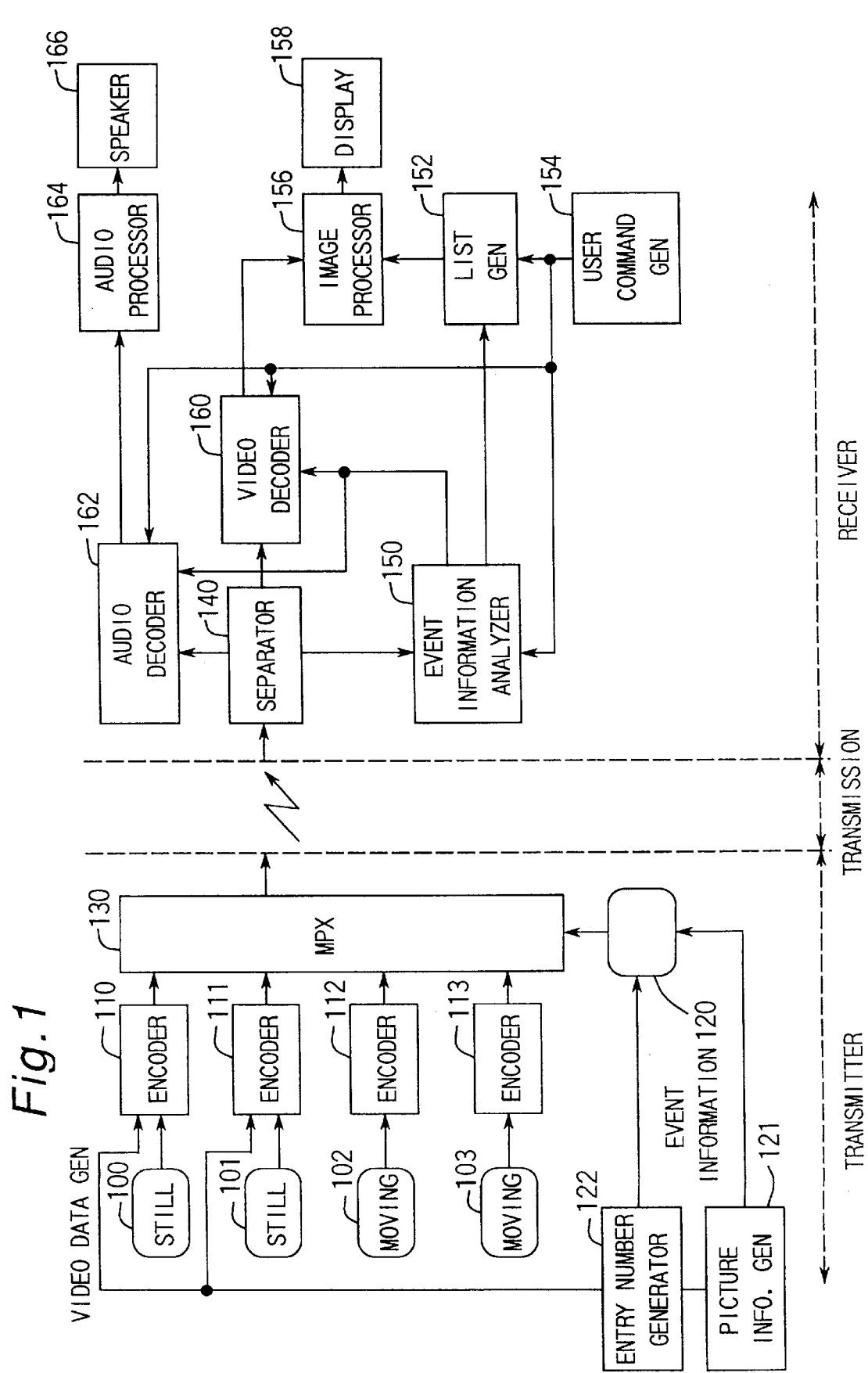

Fig. 2

Video Sequence

| | No. of bits | Mnemonic |
|---|---|---|
| video_sequence(){ | | |
|   next_start_code() | | |
|   sequence_header() | | |
|   if(nextbits() == extension_start_code){ | | |
|     sequence_extension() | | |
|     do{ | | |
|       extension_and_user_data(0) | | |
|       do{ | | |
|         if(nextbits() == group_start_code){ | | |
|           group_of_pictures_header() | | |
|           extension_and_user_data(1) | | |
|         } | | |
|         picture_header() | | |
|         picture_coding_extension() | | |
|         extensions_and_user_data(2) | | |
|         picture_data() | | |
|       }while((nextbits() == picture_start_code)| | | |
|       (nextbits() == group_start_code)) | | |
|       if(nextbits()!=sequence_end_code){ | | |
|       sequence_header() | | |
|       sequence_extension() | | |
|       } | | |
|     }while(nextbits()!=sequence_end_code) | | |
|   }else{ | | |
|     /*ISO/IEC11172-2*/ | | |
|   } | | |
|   sequence_end_code | 32 | bslbf |
| } | | |

Fig. 3

Extension and user data

| | No. of bits | Mnemonic |
|---|---|---|
| extension_and_user_data (i) { | | |
|   while ( (nextbits()=extension_start_code) \|\| | | |
|   (nextbits()=user_data_start_code) ) { | | |
|     if ( ( ( i !=1) && (nextbits()=extension_start_code ) ) | | |
|       extension_data(i) | | |
|     if (nextbits()=user_data_start_code) | | |
|       user_data() | | |
|   } | | |
| } | | |

Fig. 4

User data

| user_data | No. of bits | Mnemonic |
|---|---|---|
| user_data() { | | |
| user_data_start_code | 32 | bslbf |
| while(nextbits()!='0000 0000 0000 0000 0000 0001'){ | | |
| user_data | 8 | |
| } | | |
| next_start_code() | | |
| } | | |

Fig. 5

| Syntax | No. of Bits | Identifier |
|---|---|---|
| Event_Information_section0{ | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   service_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   transport_stream_id | 16 | uimsbf |
|   original_network_id | 16 | uimsbf |
|   segment_last_section_number | 8 | uimsbf |
|   last_table_id | 8 | uimsbf |
|   for(i=0;i<N;i++){ | | |
|     event_id | 16 | uimsbf |
|     start_time | 40 | bslbf |
|     duration | 24 | uimsbf |
|     running_status | 3 | uimsbf |
|     free_CA_mode | 1 | bslbf |
|     descriptors_loop_length | 12 | uimsbf |
|     for(i=0;i<N;i++){ | | |
|       descriptor() | | |
|     } | | |
|   } | | |
|   CRC_32 | 32 | rpchof |
| } | | |

Fig. 6    uimsbf unsigned integer most significant bit first

| Syntax | No. of Bits | Identifier |
|---|---|---|
| still_picture_descriptor(){ | | |
|   descriptor_tag | 8 | uimsbf |
|   descriptor_length | 8 | uimsbf |
|   for(i=0; i<N; i++){ | | |
|     number | 10 | uimsbf |
|     for(j=0; j<20; j++){ | | |
|       char | 8 | uimsbf |
|     } | | |
|   } | | |
| } | | |

Fig. 7

Group of pictures header

| group_of_pictures_header() { | No. of bits | Mnemonic |
|---|---|---|
| group_start_code | 32 | bslbf |
| time_code | 25 | bslbf |
| closed_gop | 1 | uimsbf |
| broken_link | 1 | uimsbf |
| next_start_code() | | |
| } | | |

Fig. 8  Picture header

| picture_header() { | No. of bits | Mnemonic |
|---|---|---|
| picture_start_code | 32 | bslbf |
| temporal_reference | 10 | uimsbf |
| picture_coding_type | 3 | uimsbf |
| vbv_delay | 16 | uimsbf |
| if(picture_coding_type==2‖picture_coding_type==3) { | | |
| full_pel_forward_vector | 1 | |
| forward_f_code | 3 | uimsbf |
| } | | |
| if(picture_coding_type==3) { | | |
| full_pel_backward_vector | 1 | |
| backward_f_code | 3 | uimsbf |
| } | | |
| while(nextbits()=='1') } | | |
| extra_bit_picture /*with the value "1"*/ | 1 | uimsbf |
| extra_information_picture | 8 | |
| } | | |
| extra_bit_picture /*with the value "0"*/ | 1 | uimsbf |
| next_start_code() | | |
| } | | |

STILL PICTURE TRANSMISSION SYSTEM

BACKGROUND OF THE INVENTION

1. Field of the Invention

The present invention relates to the transmission of still pictures in a transmission system that uses signals coded according to the MPEG2 standard.

2. Description of the Prior Art

FIG. 16 shows a block diagram of a still picture transmission system according to the prior art. Shown in FIG. 16 are the still picture requesting device 91 provided in the receiver (i.e., the user), the still picture generator 92 provided in the transmitter and used by the program broadcaster (content provider), the still picture transmission request signal line 93 output from the requesting device 91 to the still picture generator 92, the still picture file 94 stored by the content provider in the still picture generator 92, and the still picture data line 95 output by the still picture generator 92.

A still picture transmission service is currently achieved by content providers by means of the still picture transmission system described above operating as follows.

Specifically, when a user makes an individual programming request, the still picture transmission request signal is transmitted through the ling 93 to the still picture generator 92. The still picture generator 92 then searches the still picture file 94 to find the still picture data corresponding to the content of the request signal, and outputs said still picture data through another line 95 to the end user.

With this conventional method, however, a user-to-transmitter communications line 93 is required to send the still picture transmission request signal to the still picture generator 92. While this communications line (channel) 93 can be reserved with relative ease in cable and similar broadcasting systems, it is a more difficult problem in satellite broadcasting systems. Furthermore, even though the data content of the still picture data is relatively small, specifically because it is a still image, it is still necessary to reserve a dedicated transmission channel 95. As a result, the transmission channels 93 and 95 cannot be effectively utilized.

SUMMARY OF THE INVENTION

The object of the present invention is therefore to achieve a still picture transmission method whereby transmission channels are effectively utilized even in transmission systems in which a user-to-transmitter communications line is not available.

To achieve this object, a still picture transmission system comprises:

(I) a transmitter comprising:

still picture generating means for generating video data of a plurality of still pictures;

entry number generating means for generating an entry number for each still picture;

picture information generating means for generating a picture information to each still picture;

list generating means for generating a list data containing the entry numbers and corresponding picture informations;

encoding means for encoding said video data with said entry number inserted in a predetermined position correspondingly to each still picture; and transmission means for transmitting said encoded video signal with said list data; and (II) a receiver comprising:

separation means for separating said encoded video signal and list data;

list data displaying means for displaying the list data;

selecting means for selecting a particular entry number; and extracting means for extracting a still picture with said particular entry number from said encoded video signal.

Also, according to the present invention, a still picture transmitting method comprises the steps of:

generating video data of a plurality of still pictures;

adding an entry number for each still picture;

generating a list data containing the entry numbers and corresponding picture informations;

encoding said video data with said entry number inserted in a predetermined position correspondingly to each still picture; and transmitting said encoded video signal with said list data.

Furthermore, according to the present invention, a still picture receiving method for use in a still picture transmission system having a transmitter for transmitting encoded video signal of still pictures associated with entry numbers and a list data containing the entry numbers and corresponding picture informations, said receiving method comprises the steps of:

separating said encoded video signal and list data;

displaying the list data;

selecting a particular entry number; and extracting a still picture with said particular entry number from said encoded video signal.

By the invention thus comprised, a bit-stream to which list data is multiplexed is generated by the transmission means, and this multiplexed bit-stream is transmitted over a known transmission path to the receiver (user). By the separation means at the receiver, the list data and the encoded video data are used to select only the selected still picture, even in satellite broadcasting and similar transmission systems in which a user-to-transmitter communications line for sending user requests is not available.

BRIEF DESCRIPTION OF THE DRAWINGS

The present invention will become more fully understood from the detailed description given below and the accompanying diagrams wherein:

FIG. 1 is a block diagram of a still picture transmission system according to the preferred embodiments of the present invention.

FIG. 2 is a diagram used to describe the operation of the preferred embodiments of the invention.

FIG. 3 is a diagram showing the content of the extension__and__user__data() function shown in FIG. 1.

FIG. 4 is a diagram showing the content of the user__data() shown in FIG. 3.

FIG. 5 is a diagram used to describe the operation of the preferred embodiment of the invention.

FIG. 6 is a diagram used to describe in detail the content of the bit-stream definition function descriptor() shown in FIG. 5.

FIG. 7 is a diagram used to describe the operation of the first modification of the invention.

FIG. 8 is a diagram used to describe the operation of the second modification of the invention.

DESCRIPTION OF PREFERRED EMBODIMENT

The preferred embodiment of the present invention are described below with reference to the accompanying figures.

FIG. 1 is a block diagram of a still picture transmission system according to the preferred embodiment of the present invention. As shown in FIG. 1 the still picture transmission system comprises a transmitter and a receiver. The transmitter has a plurality of video data generators 100, 101, 102 and 103 each producing video signal and accompanying audio signal. The video data generators 100 and 101 are each provided for generating a series of frames of still picture image data. For example, image data generator 100 generates a series of one thousand frames of different Renaissance paintings repeatedly, and image data generator 101 generates a series of one thousand frames of different modern paintings repeatedly. If necessary, audio data are also produced from the image data generators 100 and 101 for each frame giving audible explanation to each still picture. According to the embodiment shown, the image data generators 102 and 103 are provided for generating moving picture image data and also accompanying audio data.

Figure 10:
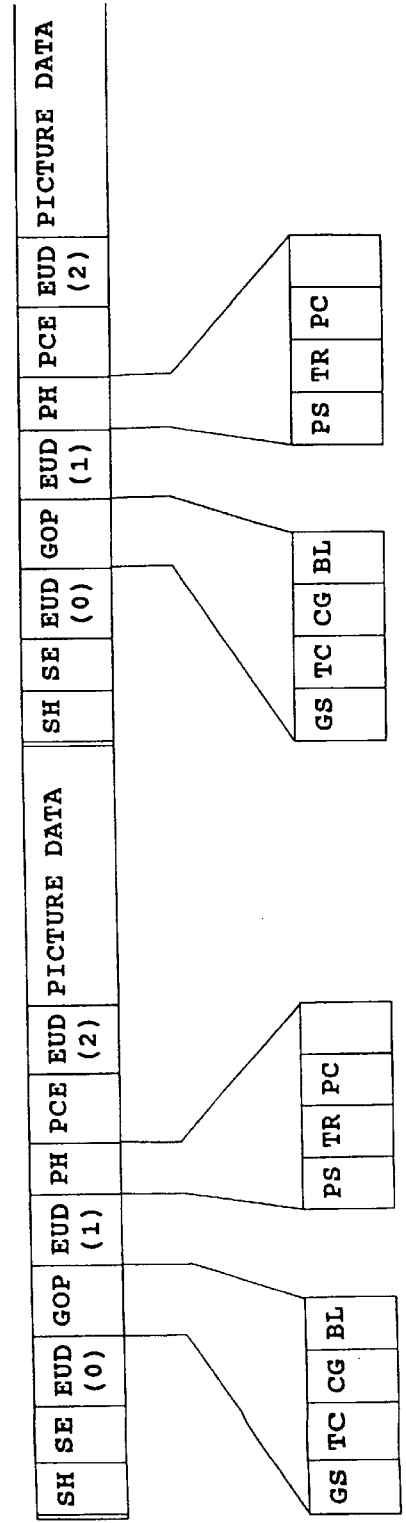
FIG. 10 is a diagram showing a video elementary bit-stream in general.

A plurality of image encoders 110, 111, 112 and 113 are coupled, respectively, to the image data generators 100, 101, 102 and 103 for converting the corresponding video data, such as still pictures, to a bit-stream conforming to the MPEG2 standard, such as shown in FIG. 10.

Generally, as shown in FIG. 10, one frame data includes: sequence header SH; sequence extension SE; first extension and user data EUD (0); group of picture header GOP; second extension and user data EUD (1); picture header PH; picture coding extension PCE; third extension and user data EUD (2); and picture data area.

It is noted that, as shown in FIG. 10, the group of header GOP includes: group start code GS; time code TC; closed gop CG; and broken link BL. Also, the picture header PH includes: picture start code PS; temporal reference TR; and picture coding type.

An event information generator 120 is provided for generating event information relating to the video data from video data generators 100–103. For example, various formats for various video data from the video data generators 100, 101, 102 and 103 are generated from the event information generator 120. The event information generator 120 is coupled with a picture information generator 121 and an entry number generator 122. The picture information generator 121 generates one or more information items of each entry picture, such as the title of the picture, name of the painter, school of the painter, year of completion of the painting. According to the preferred embodiment, 20 bytes are used for the information items for each entry picture. The entry number generator 122 generates entry numbers for the entry pictures. According to the preferred embodiment, the entry number is expressed by using 10-bit data. Using the entry numbers and the corresponding picture information, a first list L1 of one thousand Renaissance paintings is generated in the event information generator 120. Thus, the list L1 includes addresses or entry numbers and corresponding picture information such as the title of the picture, name of the painter, school of the painter, year of completion of the painting. Similarly, a second list L2 of one thousand modern paintings is generated in the event information generator 120.

Figure 9:
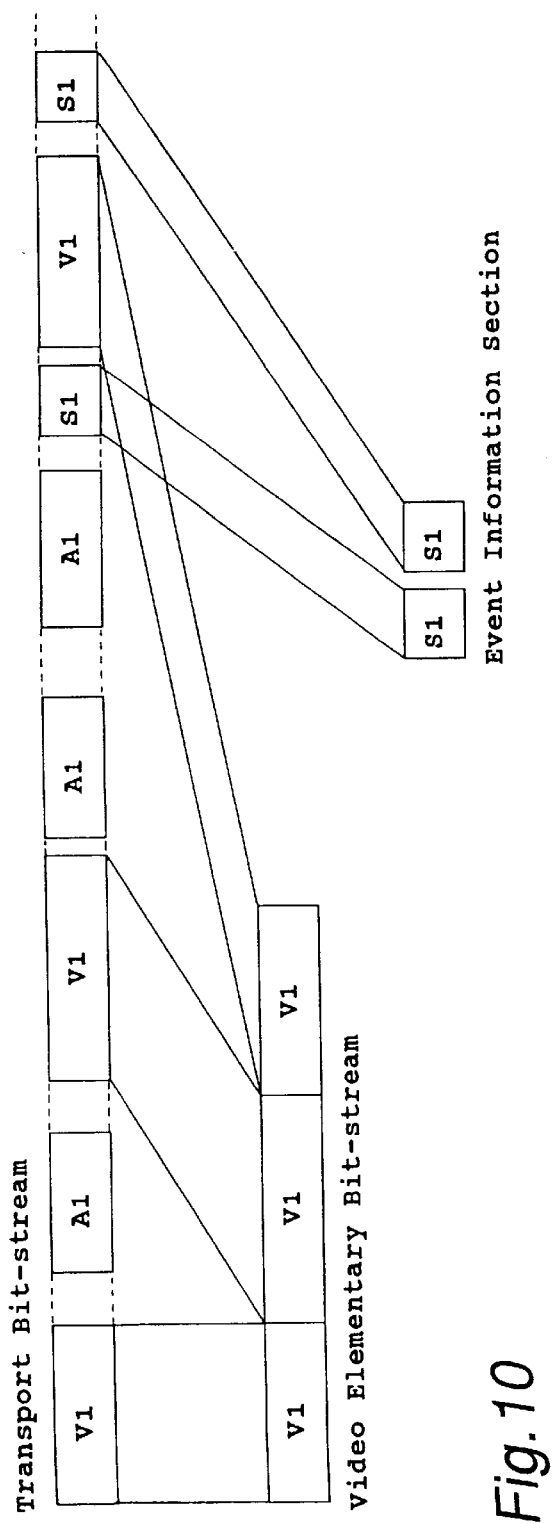
FIG. 9 is a diagram showing the transport bit-stream.

A multiplexer 130 is provided for multiplexing the various packets, such as video data packets and audio data packets from image encoders 110, 111, 112 and 113, and also event information packets from the event information generator 120. Thus, the multiplexer 130 generates a transport bit-stream, such as shown in FIG. 9. The transport bit-stream includes video packets V1, V2, V3, V4, audio packets A1, A2, A3, A4, event information packets S1, S2, S3, S4 (only the packets V1, A1, A2 and S1 are shown in FIG. 9) which are aligned in a programmed sequence. It is noted that the packets V1 and A1 are generated from encoder 110; packets V2 and A2 from encoder 111; packets V3 and A3 from encoder 112; packets V4 and A4 from encoder 113; and packets S1, S2, S3 S4 from event information generator 120.

Figure 14:
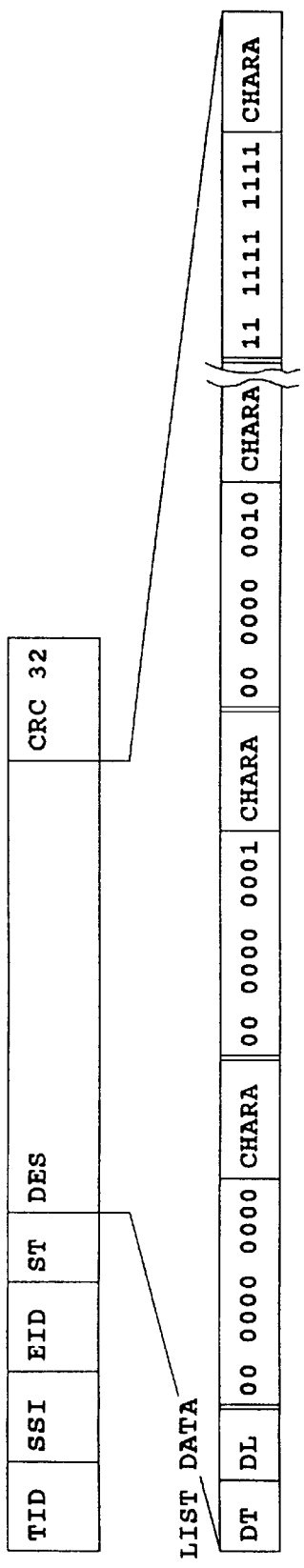
FIG. 14 is a diagram showing an event information section with list data.

According to the preferred embodiment, the lists L1 and L2 are included in event information packets S1 and S2, respectively. The event information packets S1 and S2 are also referred to as event information sections S1 and S2. As shown in FIG. 14, each event information section includes: a table identifier area TID; section syntax indicator SSI; event identifier area EID; start time area ST; descriptor area DES; and CRC 32. According to the present invention, the descriptor area DES includes: descriptor tag area DT; descriptor length area DL; and list data area. The list data area includes an address area and a character area CHARA, which are repeated one thousand times. The address is also used as an entry number. The character area CHARA is 20 byte long for inputting the character data of the above described information items for each still picture.

Figure 11:
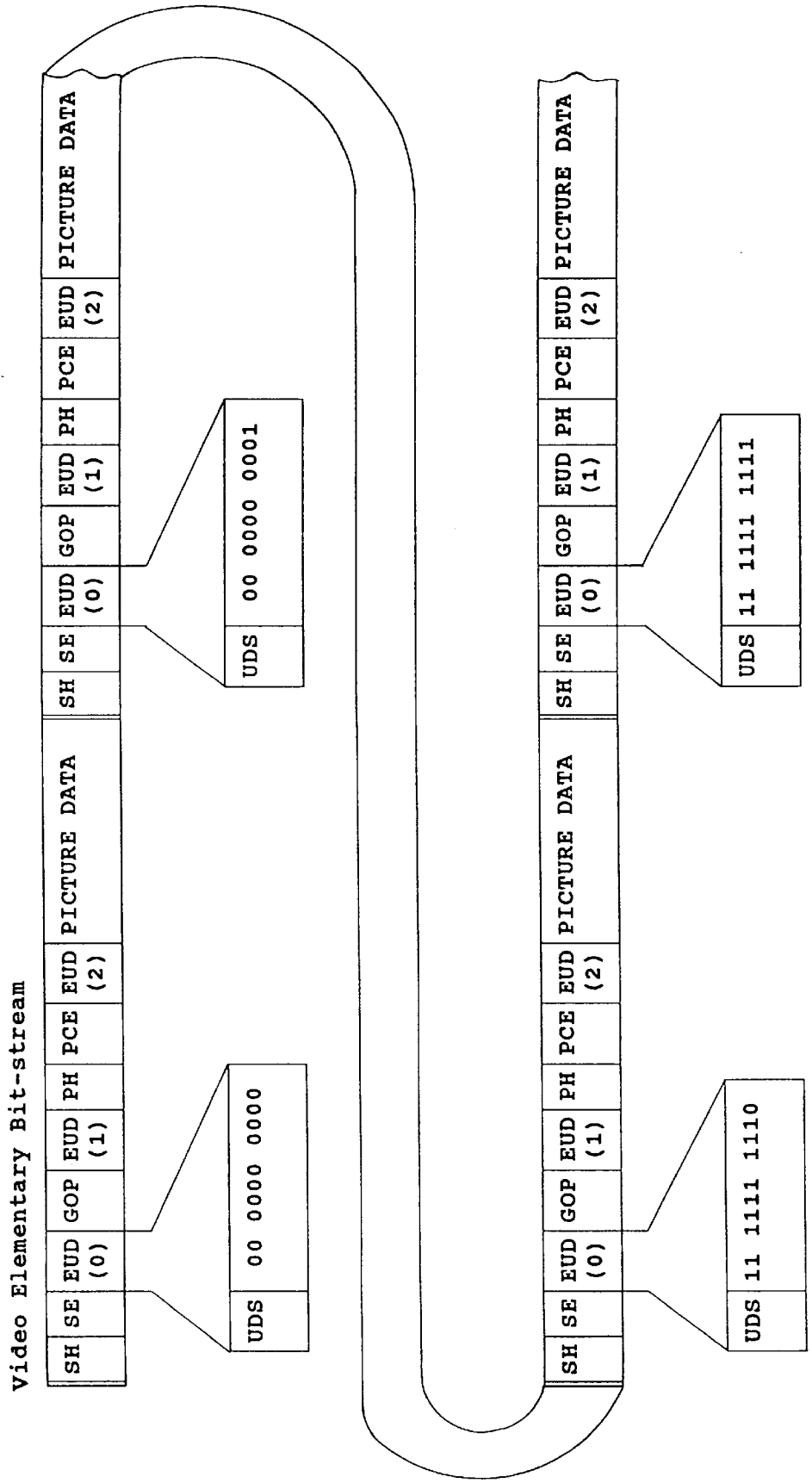
FIG. 11 is a diagram showing a video elementary bit-stream with addresses inserted in the first extension and user data EUD (0).

Also, as shown in FIG. 11, according to the preferred embodiment, the still picture image data is inserted in the picture data area in each frame. The address or the entry number of the still picture as obtained from the entry number generator 122 is inserted at encoder 110 in the first extension and user data area EUD (0). The first extension and user data area EUD (0) includes user data start code UDS and user data area. Specifically, the address or the entry number is inserted in the user data area.

According to the preferred embodiment, instead of using the first extension and user data EUD (0), it is possible to use the second extension and user data EUD (1) or the third extension and user data EUD (2) for inserting the address or the entry number of the still picture in each frame.

Referring back to FIG. 1, the transport bit-steam (FIG. 9) as produced from the multiplexer 130 is transmitted through a suitable transmission line and applied to the receiver.

The receiver includes a separator 140 for separating the transmitted bit-stream into video packets V1, V2, V3, V4, audio packets A1, A2, A3, A4, and event information packets S1, S2, S3, S4. The video packets V1, V2, V3 and V4 are applied to a video decoder 160. The audio packets A1, A2, A3 and A4 are applied to an audio decoder 162. The event information packets S1, S2, S3 and S4 are applied to event information analyzer 150.

The receiver further includes a user command generator 154, such as a remote controller with various control keys, a list generator 152, an image processor 156, a display 158, an audio processor 164, and a speaker 166.

The user command generator 154 generates a selection signal for selecting any one of video data V1, V2, V3 and V4. It is assumed that the video data V1 is selected. Thus, event information analyzer 150 analyzes the event information section S1, and extracts format data for the video data V1 and audio data A1, and also extracts the first list L1 of one thousand Renaissance paintings from the descriptor area DES (FIG. 14). The first list L1 is applied to the list generator 152 for generating an image data of the first list L1. The image data of the first list L1 is applied through the image processor 156 to display 158 for displaying the list of the Renaissance paintings on the screen 158.

The format data extracted from the event information section S1 and produced from the event information analyzer 150 are applied to the video decoder 160 and audio decoder 162 for properly converting, when one entry number is specified by the command signal, one frame video data V1 out of one thousand frame data and corresponding one audio data A1 to video signal and audio signal. In the video decoder 160, by the selection of the video data V1, video packets V1 are collected as shown in FIG. 9 to present a video elementary bit-stream. For example, if one video packet V1 includes one hundred frames of still pictures, ten successive video packets V1 are used to provide all of the one thousand Renaissance paintings. Under the present situation where the video data V1 is selected, the video decoder 160 continues to receive video packets V1, and waits for a command indicating the entry number. Similarly, in the audio decoder 162, by the selection of the video data V1, the corresponding audio data A1 are selected and presented as an audio elementary bit-stream.

Then, it is assumed that the user looking at the list L1 on the screen has selected entry number #25 (00 0001 1001) entitled "Monna Lisa". The command 00 0001 1001 indicating the entry number #25 is applied to the video decoder 160, audio decoder 162 and list generator 152. The video decoder 160 detects the first extension and user data EUD (0), and searches a frame with address 00 0001 1001 in the video elementary bit-stream. When a frame with address 00 0001 1001 is found, the picture data of the detected frame is extracted and converted to video signal for decoding a still picture carrying, in this case, an image data of "Monna Lisa". The still picture image data of "Monna Lisa" is processed in the image processor 156 in which the character data from the list L1 may be added to the image data. The processed "Monna Lisa" image data is displayed on the screen 158.

In the meantime, the command indicating the entry number #25 (00 0001 1001) is also applied to the audio decoder 162 to decode audible information data about "Monna Lisa". The audible information data is applied to the audio processor 164 and played through speaker 166.

In this manner, the command as produced by the user command generator 154 will not be sent back to the transmitter. Thus, only one way transmission line is sufficient to select a still picture from a number of still pictures offered by the transmitter.

Figure 12:
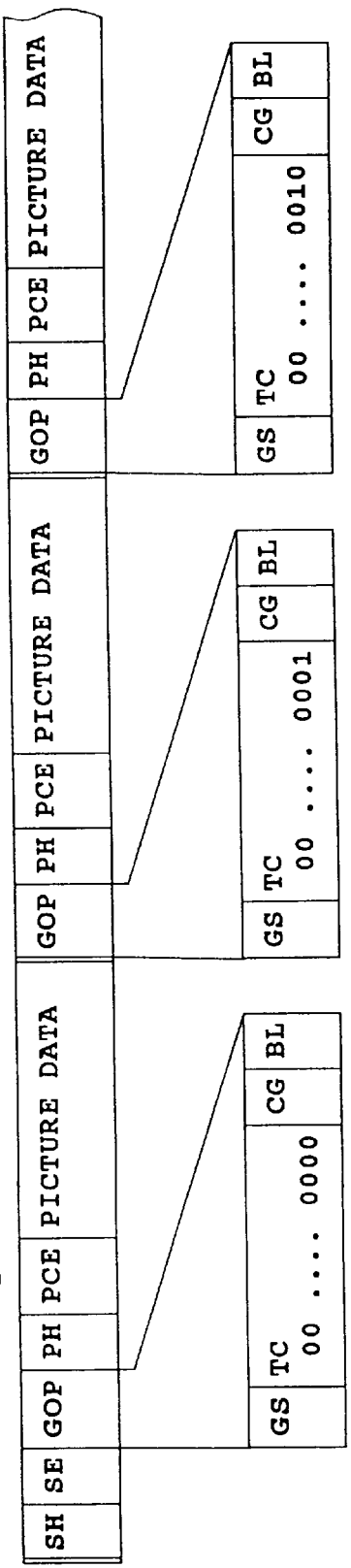
FIG. 12 is a diagram showing a first modification of the video elementary bit-stream in which the addresses are inserted in the group of picture header GOP.

Referring to FIG. 12, a first modification is shown. In the embodiment described above, the first extension and user data EUD (0) (or the second extension and user data EUD (1) or the third extension and user data EUD (2)) is used for inserting the address or the entry number of the still picture in each frame as described in connection with FIG. 11. However, according to the first modification as shown in FIG. 12, the address or the entry number of the still picture in each frame is inserted in the time code TC of the group of header GOP. It is noted that, according to the MPEG2 standard, the time code TC has a 25-bit field. The address of the entry number of the still picture can use full 25-bit field of the time code TC, or a portion thereof. Thus, the video decoder 160 detects the time code TC for obtaining a frame with a specific address in the video elementary bit-stream.

Figure 13:
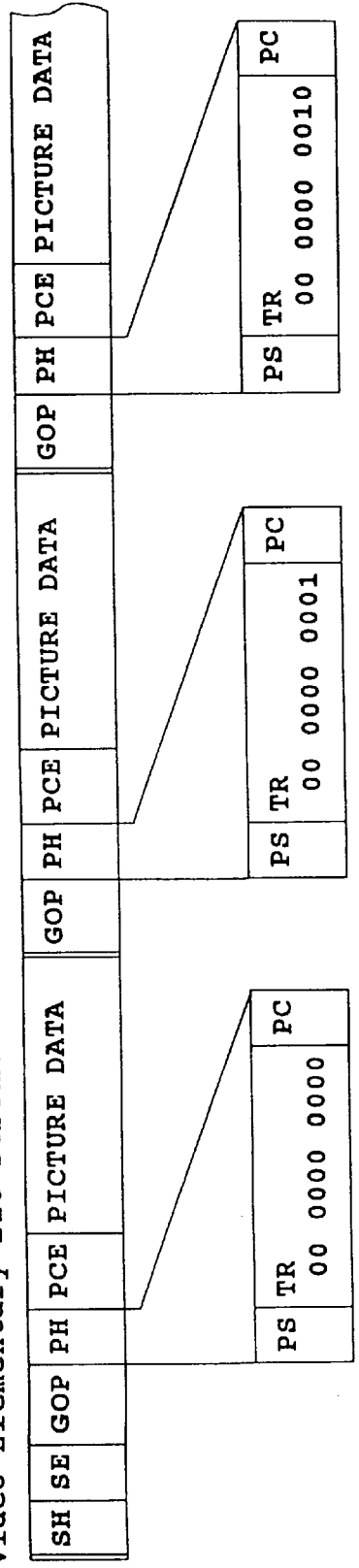
FIG. 13 is a diagram showing a second modification of the video elementary bit-stream in which the addresses are inserted in the picture header PH.

Referring to FIG. 13, a second modification is shown. According to the second modification, the address or the entry number of the still picture in each frame is inserted in the temporal reference TR of the picture header PH. Thus, the video decoder 160 detects the temporal reference TR for obtaining a frame with a specific address in the video elementary bit-stream.

Figure 15:
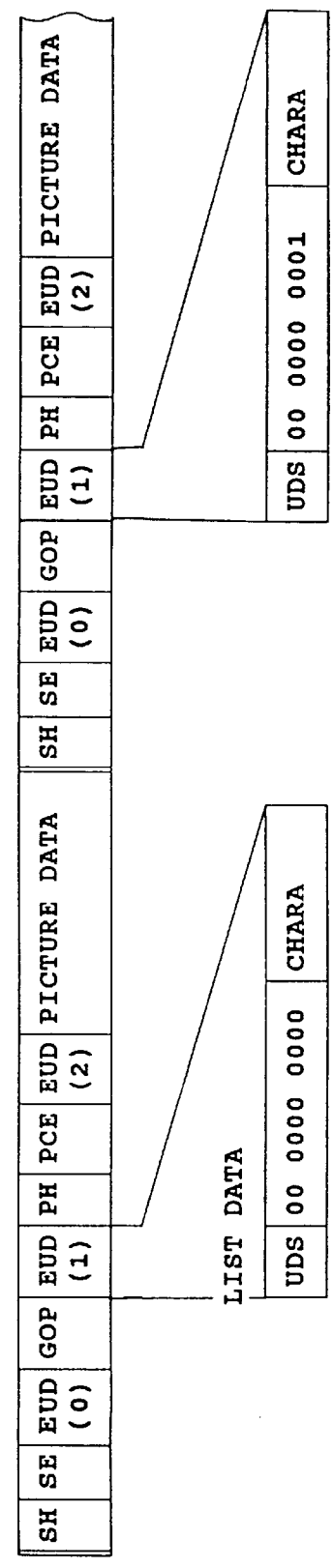
FIG. 15 is a diagram showing a third modification in which the list data is inserted in the second extension and user data EUD (1).
Figure 16:
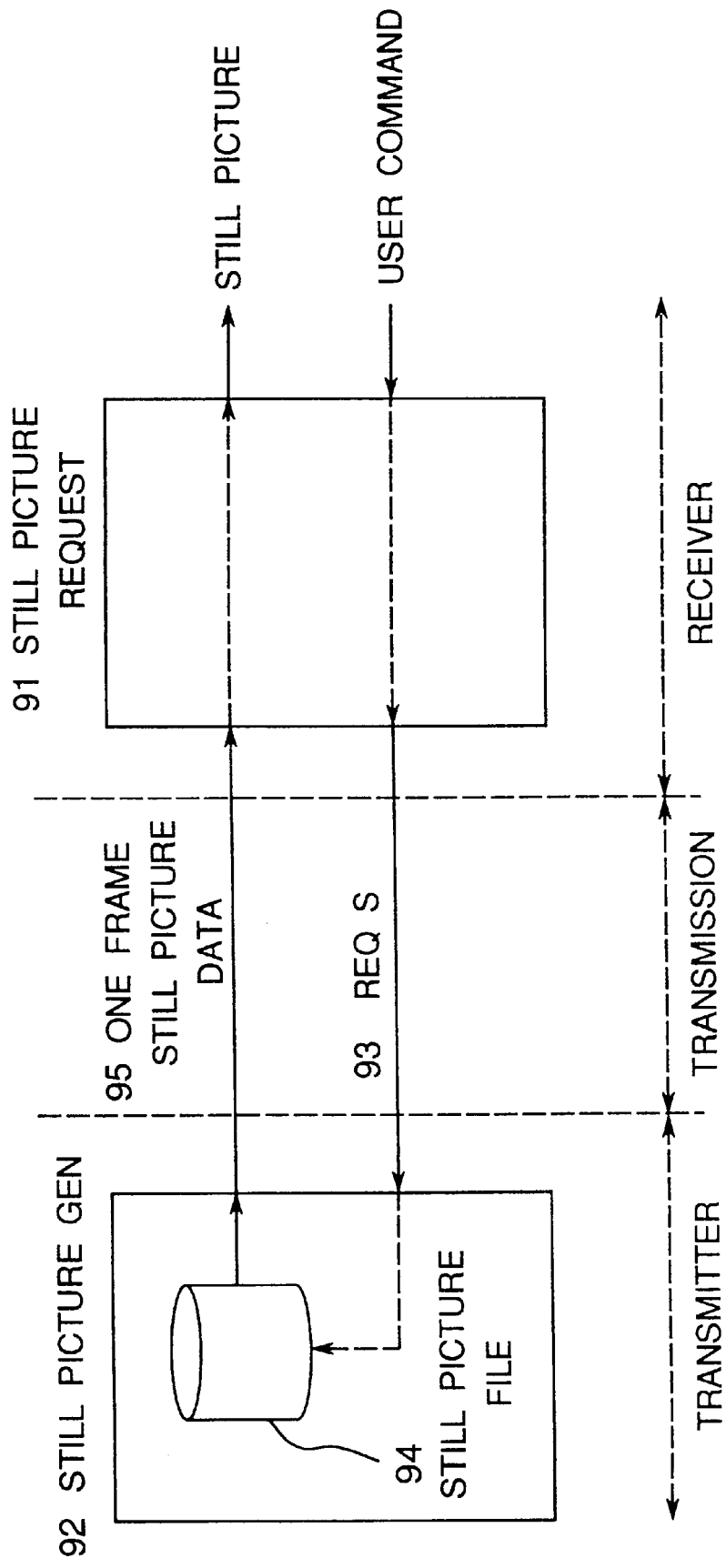
FIG. 16 is a block diagram of a still picture transmission system according to the prior art.

Referring to FIG. 15, a third modification is shown. In the preferred embodiment, the list L1 or L2 is described as added in the event information section, as shown in FIG. 14. However, according to the third modification, the list L1 or L2 is added in the extension and user data EUD, such as the second extension and user data EUD (1).

Below, the description is directed to the same embodiment and modifications described above, but based on the bit-stream definitions according to MPEG2 in connection with FIGS. 2, 3, 4, 5, 6, 7 and 8.

FIG. 2 is a video sequence table showing the video data bit-stream definitions according to MPEG2. Note that while the bit-stream definitions are expressed similarly to computer programming functions, each line in this table corresponds to a physical bit-stream. Note further that the definition of FIG. 2 presents the video elementary bit-stream shown in FIG. 10.

FIG. 3 similarly shows the content of the extension__and__user__data().

FIG. 4 shows the content of the user__data() shown in FIG. 3. The user__data() is used for inserting the address or the entry number of the still picture in each frame, as described in the above preferred embodiment.

FIG. 5 is used to describe the structure of the bit-stream for transmitting additional information in which the list L1 or L2 is inserted.

FIG. 6 is used to describe in detail the content of the bit-stream definition function descriptor() shown in FIG. 5.

The data coded in frame units is grouped using the group__of pictures (GOP) concept. Header information is added to a data block containing plural groups__of__pictures, resulting in a bit-stream sequence. The additional information added to each sequence includes the extension__and__user__data() bit-stream shown on line 7 in FIG. 2. The structure of this extension__and__user__data() bit-stream is shown in detail in FIG. 3.

The user__data() bit-stream shown in FIG. 3 is a user-defined bit-stream. The structure of this user__data() bit-stream is shown in FIG. 4. More specifically, the user__data() may be defined to contain any number of 8-bit user data units. As a result, the transmitter and receiver must define the number of user data bits contained in the user__data(), e.g., 16 bits, and increment the number by one each sequence. If the user data is 16 bits, a number ranging from 0 to 65,535 can be assigned to each GOP. If the information for one still picture is coded into one GOP, this user-defined bit has a one-to-one relationship (direct correspondence) to the frame number. More specifically, this is equivalent to assigning a frame number to each frame.

It is also necessary to transmit additional information (text information) describing the content of the image data corresponding to each number. The method of coding additional information corresponding to the frame numbers is described next.

FIG. 5 is used to describe the method of transmitting the additional information for each program. A bit-stream containing this additional information is generated according to the signal definition shown in FIG. 5. FIG. 6 shows the content of the bit-stream definition function descriptor() in FIG. 5. As in FIG. 2, a program function syntax is used in FIGS. 5 and 6, but each line corresponds to the hardware expressing the number of bits.

The value of the descriptor_tag in FIG. 6 is normally assigned as a fixed value for each application, and a value reserved as a user-defined range value is therefore used. As a result, a user definition as shown in FIG. 6 is possible.

The syntax shown in FIG. 6 allocates 10 bits for the frame number, and 20 bytes (1 byte=8 bits) for the additional information corresponding to each frame number. As a result, frame numbers can be defined in the range from 0 to 1023 (assuming 8 bits per letter), and additional information containing twenty characters per frame can be defined for each frame number.

The bit-stream of the video signal generated as described above is then multiplexed with the additional lists by the multiplexer 130, and coded according to the MPEG2 standard. The result of this multiplex coding operation is the output of the transmitter.

The decoding procedure is described next. The output from the transmitter is input to the separator 140. The separator 140 separates the supplied bit-stream into event information packets, video elementary bit-stream and audio elementary bit-stream according to the MPEG2 standard.

The list information is detected by the event information analyzer 150, the list information (text information) is displayed for the user, and the entry number of the frame to be displayed is then output based on the input from the user.

Based on the input from the event information analyzer 150, the video decoder 160 decodes and displays only the image sequence containing the specified frame number. The specifics of this image reproduction process are not essential to the present invention and are therefore omitted below. For further information, please refer to the MPEG2 standard.

The output from the video decoder 160 is the still picture output, and the user is therefore able to view the desired still picture on the screen 158.

The still picture data includes both the image data and the additional information transmitted at a constant regular period. The receiver perceives the transmitted images as a still picture file in random sequence.

It will be obvious that the descriptor_tag value may be a value reserved for future use rather than a user-defined value while still achieving the same effect.

The additional information in this preferred embodiment has been described as coded using a descriptor describing the detailed program content. The same effect can be achieved, however, if the additional information is coded using descriptors defined to transmit additional information relating to the channel configuration of the broadcasting system.

Referring to FIG. 7, the first modification is again described. FIG. 7 shows the content of the bit-stream definition function group_of_pictures_header() shown in FIG. 2.

The time_code bit shown in FIG. 7 is defined in the MPEG2 standard as the bit representing the GOP sequence number, and is incremented one each GOP. The encoder, such as 110, writes the frame number for each still picture to this time_code bit before image data coding. The operation of the other functional blocks in the transmitter is the same as that in the preferred embodiment above, and further description thereof is thus omitted below. The additional information coding procedure is also identical to that of the preferred embodiment.

In the event information analyzer 150, the time_code bit shown in FIG. 7 is read to recognize the frame number of the bit-stream, the functional blocks operate the same as in the preferred embodiment above. As a result, still pictures can be transmitted as described in the preferred embodiment above.

By assigning a frame number to the image data using a bit predefined in the GOP header rather than a user-defined bit value in this first modification, no user data is added, and it is not necessary to lower the overall coding efficiency of the bit-stream flowing to the transmission path.

In addition, because 25 bits are reserved for the time_code, up to $2^{25}$ frame numbers (=33,554,432) can be assigned, assuring sufficient capacity for all possible frame numbers.

The second modification is again described below with reference to FIG. 8. FIG. 8 shows the content of the bit-stream definition function picture_header() shown in FIG. 2.

The temporal_reference bit shown in FIG. 8 is a local data bit in a specific GOP as shown in FIG. 2, and is defined as a serial number for each image frame.

Therefore, when plural still pictures are coded to a single GOP, this bit is used to assign the frame numbers. By using this temporal_reference bit, it is possible to discriminate the still picture frame numbers even when plural still pictures are coded to one GOP.

Except for using the temporal_reference bit shown in FIG. 8 to identify the still picture frame numbers, the other functional blocks in the transmitter operate the same as in the preferred embodiment above. As a result, still pictures can be transmitted as described in the preferred embodiment above. The coding method of the additional information of the list is also the same as in the preferred embodiment above.

In the event information analyzer 150, the temporal_reference bit shown in FIG. 8 is read to recognize the frame numbers of the bit-stream, the functional blocks operate the same as in the preferred embodiment above. As a result, still pictures can be transmitted as described in the preferred embodiment above.

Because the image content is complete within each GOP in the second modification of the invention, still pictures can be transmitted without affecting the other GOPs. Furthermore, because ten bits are reserved for the temporal_reference in the MPEG2 standard, using this bit is well-suited to relatively small-scale still picture transmission systems using up to 1024 images. However, because the temporal_reference bit is re-initialized at the beginning of each GOP, frame numbers cannot be sequentially assigned across plural GOPs.

Because coding is completed within each GOP in this second modification of the invention, numbers can be easily assigned hierarchically to the still picture frames by combining this second modification with the preferred embodiment or the first modification.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A still picture transmission system, comprising:

an encoder for encoding still pictures as video data, in which a specific entry number is assigned to each still picture prior to coding and the specific entry numbers are coded together with the still pictures;

a list generator that generates list data containing all of the entry numbers and containing picture information corresponding to each entry number;

a transmitter that combines said video data, including the still pictures coded with said specific entry numbers, together with said list data, containing all of the entry numbers and the picture information into a combined signal, and that transmits the combined signal, a receiver that receives said combined signal containing said video data including said still pictures assigned said specific entry numbers and containing said list data;

a selector that selects a particular entry number from all of the entry numbers in the list data, said particular entry number corresponding to a selected one of said still pictures; and a decoder that decodes, according to said particular entry number, said specific entry numbers and said selected one of said still pictures from said video data, for displaying said selected one of said still pictures assigned said particular entry number.

2. A still picture transmitter comprising:

a still picture generator that generates video data of a plurality of still pictures;

an entry number generator that generates an entry number for each still picture;

a picture information generator that generates picture information corresponding to each still picture;

a list generator that generates list data containing all of the entry numbers and corresponding picture information;

an encoder that encodes said video data with said entry numbers inserted in predetermined positions corresponding to each still picture to form an encoded video signal; and a transmitter device that transmits said encoded video signal, including the video data encoded with said entry numbers, combined together with all of said list data, containing all of the entry numbers and corresponding picture information.

3. A still picture receiver comprising:

a separator which separates encoded video signal and list data from a received signal, said received signal including said encoded video signal combined together with said list data, said encoded video signal including still pictures and entry numbers, each still picture associated with a corresponding entry number, and said list data including all of the corresponding entry numbers and including corresponding picture information;

a display system which displays the list data;

a selector that selects a particular entry number from all of the entry numbers in said list data; and an extractor that extracts one of said still pictures corresponding to said particular entry number in said list data from said encoded video signal according to said corresponding entry numbers in said encoded video signal.

4. A still picture transmission system comprising:

a transmitter comprising:
a still picture generator that generates video data of a plurality of still pictures;
an entry number generator that generates an entry number for each still picture;
a picture information generator that generates picture information for each still picture;
a list generator which generates list data containing all of the corresponding entry numbers and containing picture information corresponding to each entry number;
an encoding system that encodes said video data together with said entry numbers, each of said entry numbers being inserted in a predetermined position corresponding to each still picture; and
a transmission system that transmits said encoded video signal, including said video data and encoded entry numbers, combined together with said list data, including all of the entry numbers and the corresponding picture information; and a receiver comprising:
a separator that separates said encoded video signal from said list data;
a list data display system that displays the list data;
a selector that selects a particular entry number from all of the entry numbers in said list data; and
an extractor that extracts one of said still pictures corresponding to said particular entry number in said list data from said encoded video signal according to said entry numbers in said encoded video signal.

5. A still picture transmission system according to claim 4, wherein said encoded video signal including said entry numbers is in a form of a bit-stream conforming to an MPEG2 standard.

6. A still picture transmission system according to claim 5, wherein said predetermined position is an extension__and__user__data() in a video__sequence() conforming to the MPEG2 standard.

7. A still picture transmission system according to claim 5, wherein said predetermined position is a group__of__pictures__header() in a video__sequence() conforming to the MPEG2 standard.

8. A still picture transmission system according to claim 5, wherein said predetermined position is a temporal__reference in a picture__header() of the video__sequence() conforming to the MPEG2 standard.

9. A still picture transmission system according to claim 5, wherein said list data is inserted in an event information section conforming to the MPEG2 standard.

10. A still picture transmission system according to claim 5, wherein said list data is inserted in an extension__and__user__data() in a video__sequence() conforming to the MPEG2 standard.

11. A still picture transmitting method, comprising:

generating video data of a plurality of still pictures;

adding an entry number for each still picture to said video data;

generating list data containing all of the entry numbers corresponding to each still picture and containing corresponding picture information;

encoding said video data together with said entry numbers inserted in predetermined positions corresponding to each still picture; and transmitting said encoded video signal, including said video data encoded together with said entry numbers, combined together with said list data, and including all of the entry numbers and corresponding picture information.

12. A still picture receiving method, said receiving method comprising:

separating an encoded video signal and list data from a received signal, said received signal including said encoded video signal combined together with said list data, said encoded video signal including still pictures and entry numbers, each still picture associated with a corresponding entry number and said list data including all of the corresponding entry numbers and including corresponding picture information;

displaying the list data;

selecting a particular entry number from all of the entry numbers in said list data; and extracting one of said still pictures corresponding to said particular entry number in said list data from said encoded video signal according to said corresponding entry numbers in said encoded video signal.

* * * * *